United States Patent
Bent et al.

(10) Patent No.: US 9,659,019 B1
(45) Date of Patent: May 23, 2017

(54) BURST BUFFER APPLIANCE WITH STORAGE TIERING CONTROL FUNCTIONALITY BASED ON USER SPECIFICATION

(71) Applicant: EMC IP Holding Company LLC, Hopkinton, MA (US)

(72) Inventors: John M. Bent, Los Alamos, NM (US); Sorin Faibish, Newton, MA (US); Uday Gupta, Westford, MA (US); Tao Peng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 13/929,025

(22) Filed: Jun. 27, 2013

(51) Int. Cl.
*G06F 17/30* (2006.01)

(52) U.S. Cl.
CPC .. *G06F 17/30091* (2013.01); *G06F 17/30194* (2013.01)

(58) Field of Classification Search
CPC ............. G06F 17/30194; G06F 3/0657; G06F 17/30221; G06F 3/067
See application file for complete search history.

(56) References Cited

U.S. PATENT DOCUMENTS

| | | | |
|---|---|---|---|
| 5,600,817 A * | 2/1997 | Macon, Jr. .......... | G06F 12/0862 711/113 |
| 7,406,473 B1 * | 7/2008 | Brassow ........... | G06F 17/30067 |
| 7,509,409 B2 * | 3/2009 | Penny et al. ................... | 709/223 |
| 7,693,954 B1 * | 4/2010 | Hughes et al. ............... | 709/213 |
| 7,716,425 B1 * | 5/2010 | Uysal .................. | G06F 12/0862 711/137 |
| 8,612,312 B1 * | 12/2013 | Edwards ............ | G06Q 30/0633 705/26.8 |
| 8,843,459 B1 * | 9/2014 | Aston et al. ................... | 707/694 |
| 2004/0133650 A1 * | 7/2004 | Miloushev ........ | G06F 17/30197 709/213 |
| 2005/0195660 A1 * | 9/2005 | Kavuri et al. ........... | 365/189.05 |
| 2007/0094452 A1 * | 4/2007 | Fachan ............... | G06F 12/0862 711/137 |

(Continued)

OTHER PUBLICATIONS

"PLFS: A Checkpoint Filesystem for Parallel Applications" by Bent et al. 2009. available at <http://institute.lanl.gov/plfs/plfs.pdf>.*

(Continued)

*Primary Examiner* — Robert Beausoliel, Jr.
*Assistant Examiner* — Arthur Ganger
(74) *Attorney, Agent, or Firm* — Ryan, Mason & Lewis, LLP

(57) ABSTRACT

A cluster file system comprises a burst buffer appliance coupled to a plurality of object storage servers via a network. The burst buffer appliance is configured to implement storage tiering control functionality based on a user specification for at least first and second storage tiers comprising respective disjoint subsets of the plurality of object storage servers. The user specification comprises, for example, a user request to move data from a first storage tier to a second storage tier; for an indication of where a given file is stored; for an indication of a given storage tier where a given file is stored and/or for an indication of an object storage server storing one or more given file portions.

29 Claims, 9 Drawing Sheets

(56) References Cited

U.S. PATENT DOCUMENTS

| | | | |
|---|---|---|---|
| 2008/0281908 A1* | 11/2008 | McCanne | G06F 17/30156 709/203 |
| 2009/0157756 A1* | 6/2009 | Sanvido | 707/200 |
| 2012/0310892 A1* | 12/2012 | Dam et al. | 707/659 |
| 2013/0080715 A1* | 3/2013 | Mori et al. | 711/154 |
| 2013/0227194 A1 | 8/2013 | Kannan et al. | |
| 2014/0351300 A1 | 11/2014 | Uppu et al. | |
| 2014/0359050 A1* | 12/2014 | Butt | G06F 15/17331 709/214 |

OTHER PUBLICATIONS

"Definition of DAEMON (Meaning of DAEMON), a 6 Letter Word." HyperDictionary. hyperdictionary.com, n.d. Web. Mar. 16, 2015. <http://www.hyperdictionary.com/search.aspx?define=daemon>.*

"What is NFS Caching?" by George Crump. Published Jun. 22, 2011. Accessed Sep. 30, 2015 from website <http://www.storage-switzerland.com/Articles/Entries/2011/6/22_What_is_NFS_Caching.html>.*

* cited by examiner

FIG. 5

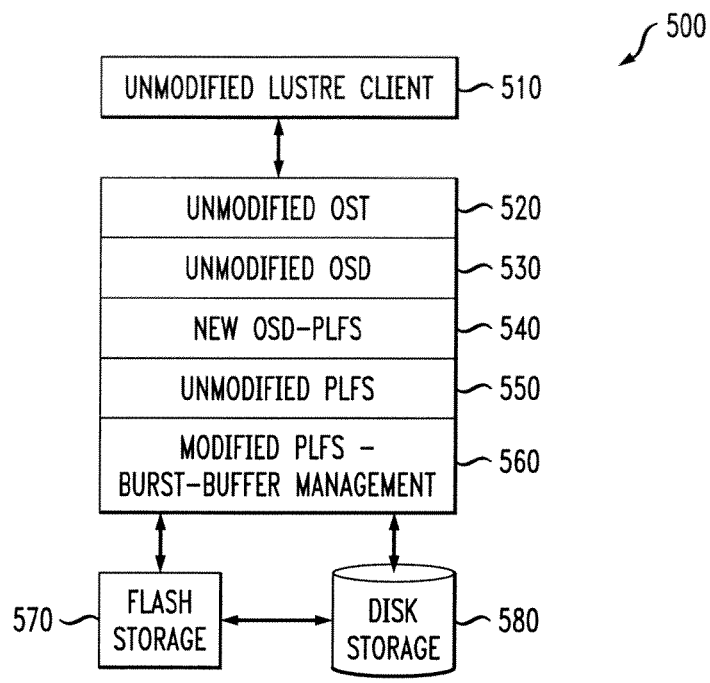

FIG. 6

```
# write data
write(buffer,file,offset,length) {
        # do like normal lustre osd with a few exceptions
        # 1. send activity log to PLFS daemon, wait for permission
        # 2. send all write data to fast flash devices

} read data
read(buffer,file,offset,length) {
        # do like normal lustre osd with a few exceptions
        # 1. check whether file data is in flash or disk
        # 2. if in disk, ask data placement and migration
             controller 440 to start copying data into flash
        # 3. send activity log to PLFS daemon

```
# get activity log both from OSD-Burst Buffer 150 and from other daemons 700.
OSD-Burst Buffer 150 sends writes, reads, unlinks.
# other plfs daemon counterparts will send pre-stage requests/suggestions
receive_activity_log(event e) {
    if (e.type == WRITE) {
        # if a write, record timestamp, and reserve space for it on
        # flash device. Keep a list of all blocks in flash. When
        # space runs low, ask data placement and migration controller 440
        to move some blocks to disk.
        available_blocks -= e.size;
        if (available_blocks <= space_threshold) {
            victims = search_for_victims0
            msg = pack_msg(victims,EVICT)
            send_msg(msg,data_mover)
        }
        if (e.size > available_blocks) {
            # wait for free space
        }
    } elif e.type == UNLINK {
        available_blocks += e.size;
    } elif e.type == READ {
        # if a read, make a guess about whether to start prefetching
        rest of data
        if (e.file in recent_activity AND e.file NOT in flash)
        {# this file is hot on disk!
            msg = pack_msg(e.file,PRESTAGE)
            plfs_map = plfs_get_map(e.file)
            foreach osd in plfs_map.osds {
                send_msg(msg,osd) # suggest to peers that they
                start prestaging this
            }
            send_msg(msg,data_mover) # also promote this file locally
        }
    } elif e.type == PRESTAGE { # a peer suggested we start prestaging this
        if (e.file NOT in flash) {
            msg = pack_msg(e.file,PRESTAGE)
            send_msg(msg,osd)
        }
    }
}
```

FIG. 9A

```
# user API
int plfs_file_prestage(const char *file);
```
⎯ 900

FIG. 9B

```
# PLFS daemon code
int plfs_file_prestage(const char *file) {
    # first figure out which OSD's have chunks of this file
    plfs_map pmap;
    pmap = plfs_file_map(file);

# then send each of them a message
    # simple optimizations to parallelize this should be done here
    foreach OSD-bb in pmap.osds {
        const char msg_buffer[PLFS_MSG_SIZE];
        pack_msg(PLFS_PRESTAGE,file);
        send_msg(OSD-bb)
    } at this point, wait for return status from each OSD-bb
}
```
⎯ 920

FIG. 9C

```
# data migrator
# trivial to implement plfs_file_purge by doing this in reverse
int plfs_file_prestage(const char *file) {
        # first figure out which chunks of file are hosted local
        plfs_map pmap;
        pmap = plfs_file_map(file);

# transfer each chunk (read data from disk, write to flash)
        foreach data_chunk in pmaps.chunks {
                if data.chunk.is_local() {
                        read(data.chunk, OSD-ldiskfs(disk));
                        write(data.chunk, OSD-ldiskfs(flash));
                }
                pmap.chunk.replica.add(flash)# remember we made a copy
        } pmap.persist() # we modified it to remember replicas, so save it
}
```

FIG. 9D

```
# OSD-Burst Buffer
# implement plfs_tile_purge by doing this in reverse
int plfs_file_prestage(const char *file) {
        # ask the data mover 440 to do it
        char msg_buf[BUFSZ]
        pack_msg(msg_buf, file)

# in real practice, this would be implemented with an
        # asynchronous event queue
        return send_msg(data_mover, msg_but)
}
```

BURST BUFFER APPLIANCE WITH STORAGE TIERING CONTROL FUNCTIONALITY BASED ON USER SPECIFICATION

CROSS-REFERENCE TO RELATED APPLICATIONS

The present application is related to U.S. patent application Ser. No. 13/928,985, filed Jun. 27, 2013, entitled "Cluster File System with a Burst Buffer Appliance for Controlling Movement of Data Among Storage Tiers;" and U.S. patent application Ser. No. 13/928,940, filed Jun. 27, 2013, entitled "Cluster File System with a Burst Buffer Appliance for Coordinated Control of Data Movement Among Storage Tiers Across a Plurality Of Object Storage Servers," (now U.S. Pat. No. 9,454,331), each incorporated by reference herein.

FIELD

The field relates generally to data storage, and more particularly, to parallel file systems and other types of cluster file systems.

BACKGROUND

A cluster file system allows multiple client devices to share access to files over a network. One well-known cluster file system is the Lustre® file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Accordingly, despite the many advantages of Lustre® file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that implement storage tiering control functionality across a plurality of object storage servers using a burst buffer appliance based on a user specification, so as to provide significant improvements relative to conventional arrangements. For example, such arrangements allow for transparent inclusion of a flash storage tier in a cluster file system in a manner that avoids the need for any significant changes to clients, object storage servers, metadata servers or applications running on those devices.

In one embodiment, a cluster file system comprises a burst buffer appliance coupled to a plurality of object storage servers via a network. The burst buffer appliance is configured to implement storage tiering control functionality for at least first and second storage tiers comprising respective disjoint subsets of the plurality of object storage servers. The burst buffer appliance implements the movement of data between the first and second storage tiers based on a user specification. The user specification comprises, for example, a user request to move data from a first storage tier to a second storage tier; for an indication of where a given file is stored; for an indication of a given storage tier where a given file is stored and/or for an indication of an object storage server storing one or more given file portions.

The object storage servers in the first storage tier may be configured to interface with object storage targets of a first type and the object storage servers in the second storage tier may be configured to interface with object storage targets of a second type different than the first type. For example, the object storage targets of the first type may comprise non-volatile electronic storage devices such as flash storage devices, and the object storage targets of the second type may comprise disk storage devices.

As noted above, illustrative embodiments described herein provide significant improvements relative to conventional arrangements. In some of these embodiments, use of a flash storage tier in conjunction with a disk storage tier allows dynamic balancing of storage capacity and IO throughput requirements in a cluster file system, thereby allowing particular levels of performance to be achieved at a significantly lower cost than would otherwise be possible. Similar improvements are provided using other numbers and types of storage tiers, with migration between the tiers being controlled by one or more burst buffers of the cluster file system.

BRIEF DESCRIPTION OF THE DRAWINGS

FIG. 5 illustrates an exemplary stack for the OSD-PLFS of FIG. 4;

FIGS. 6 and 7 illustrate exemplary pseudo code for the OSD-Burst Buffer and PLFS daemon of FIG. 4;

FIGS. 9A through 9D illustrate pseudo code for the user interface, PLFS daemon, data migrator and OSD-Burst Buffer of FIG. 4.

DETAILED DESCRIPTION

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices.

According to one aspect of the invention, discussed further below in conjunction with FIGS. 4, 8 and 9A-9D, cluster file systems implement coordinated storage tiering control functionality across a plurality of object storage servers based on a user or client specification using one or more burst buffer appliances.

Figure 1:
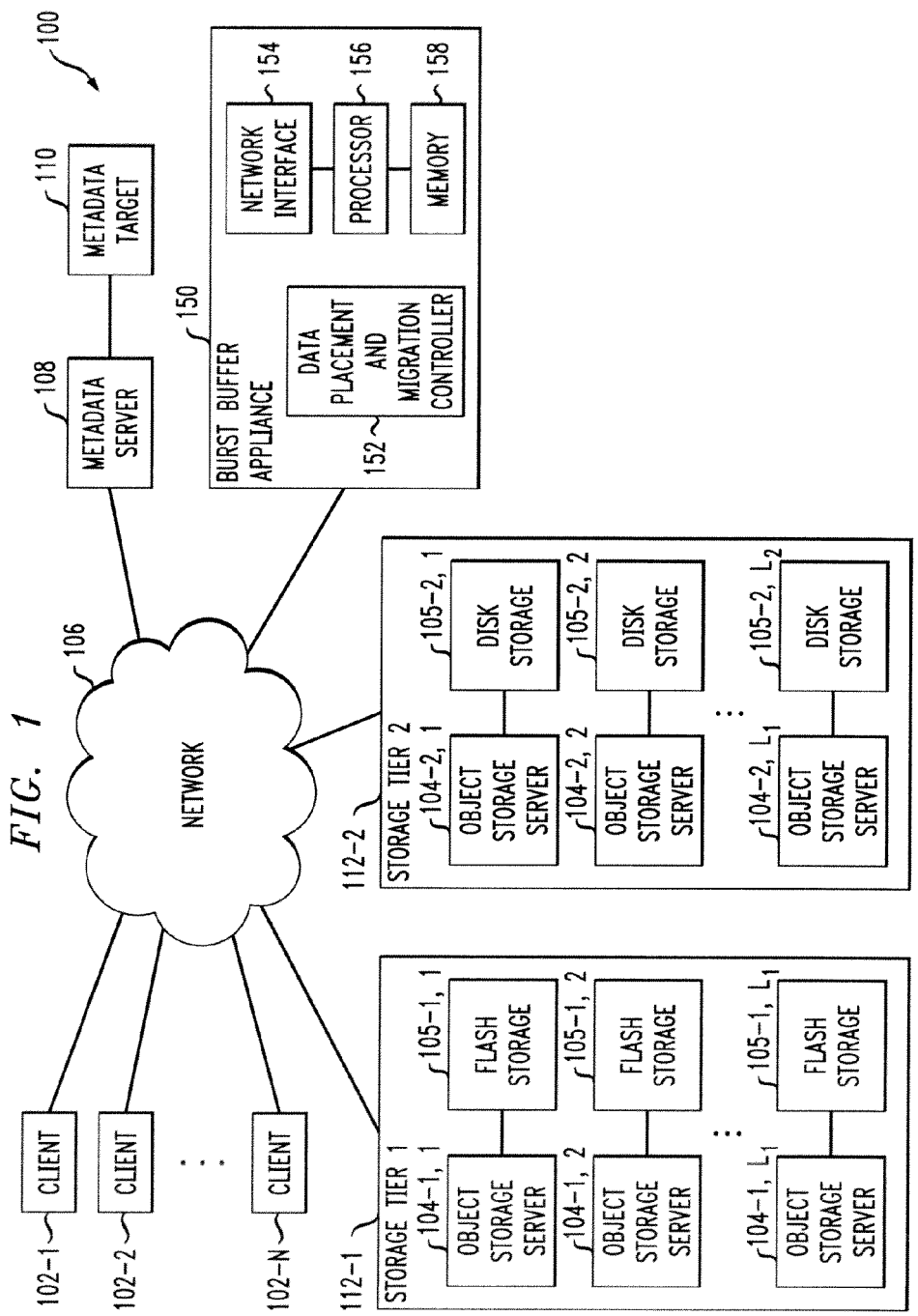
FIG. 1 is a block diagram of a cluster file system having multiple storage tiers and a burst buffer appliance in an illustrative embodiment of the invention.

FIG. 1 shows a cluster file system 100 configured in accordance with an illustrative embodiment of the present invention. The cluster file system 100 comprises a plurality of clients 102 and a plurality of object storage servers 104. More particularly, the cluster file system 100 comprises N clients denoted 102-1, 102-2, . . . 102-N, and two groups of object storage servers denoted 104-1,1 through 104-1,$L_1$ and 104-2,1 through 104-2,$L_2$. Each of the object storage servers 104 has a corresponding storage device 105 which may comprise a storage array or other type of storage device. Thus, the object storage servers 104-1,1 through 104-1,$L_1$ and 104-2,1 through 104-2,$L_2$ have associated storage devices 105-1,1 through 105-1,$L_1$ and 105-2,1 through 105-2,$L_2$, respectively. The clients 102 and the object storage servers 104 communicate with one another over a network 106. The storage devices 105 are also referred to herein as object storage targets of their corresponding object storage servers 104.

The cluster file system 100 further comprises a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its metadata target 110 in processing metadata requests received from the clients 102 over the network 106. The metadata target 110 may comprise a storage array or other type of storage device.

Storage arrays utilized in the cluster file system 100 may comprise, for example, storage products such as VNX® and Symmetrix VMAX®, both commercially available from EMC Corporation of Hopkinton, Mass. A variety of other storage products may be utilized to implement at least a portion of the object storage targets and metadata target of the cluster file system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 in the present embodiment are arranged into first and second storage tiers 112-1 and 112-2, also denoted as Storage Tier 1 and Storage Tier 2, although it is to be appreciated that more than two storage tiers may be used in other embodiments. As noted above, each of the storage devices 105 may be viewed as being representative of an object storage target of the corresponding one of the object storage servers 104. The first and second storage tiers 112-1 and 112-2 comprise respective disjoint subsets of the object storage servers 104. More particularly, the first storage tier 112-1 comprises object storage servers 104-1,1 through 104-1,$L_1$ and the corresponding storage devices 105-1,1 through 105-1,$L_1$, and the second storage tier 112-2 comprises object storage servers 104-2,1 through 104-2,$L_2$ and the corresponding storage devices 105-2,1 through 105-2,$L_2$.

The client 102 may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

The different storage tiers 112-1 and 112-2 in this embodiment comprise different types of storage devices 105 having different performance characteristics. As mentioned previously, each of the object storage servers 104 is configured to interface with a corresponding object storage target in the form of a storage device 105 which may comprise a storage array. The object storage servers 104-1,1 through 104-1,$L_1$ in the first storage tier 112-1 are configured to interface with object storage targets of a first type and the object storage servers 104-2,1 through 104-2,$L_2$ in the second storage tier 112-2 are configured to interface with object storage targets of a second type different than the first type. More particularly, in the present embodiment, the object storage targets of the first type comprise respective flash storage devices 105-1,1 through 105-1,$L_1$, and the object storage targets of the second type comprise respective disk storage devices 105-2,1 through 105-2,$L_2$.

The flash storage devices of the first storage tier 112-1 are generally significantly faster in terms of read and write access times than the disk storage devices of the second storage tier 112-2. The flash storage devices are therefore considered "fast" devices in this embodiment relative to the "slow" disk storage devices. Accordingly, the cluster file system 100 may be characterized in the present embodiment as having a "fast" storage tier 112-1 and a "slow" storage tier 112-2, where "fast" and "slow" in this context are relative terms and not intended to denote any particular absolute performance level. These storage tiers comprise respective disjoint subsets of the object storage servers 104 and their associated object storage targets 105. However, numerous alternative tiering arrangements may be used, including three or more tiers each providing a different level of performance. The particular storage devices used in a given storage tier may be varied in other embodiments and multiple distinct storage device types may be used within a single storage tier.

Also, although only a single object storage target is associated with each object storage server 104 in the FIG. 1 embodiment, other embodiments may associate multiple object storage targets with each object storage server. An example of an arrangement of the latter type will be described below in conjunction with FIG. 2.

The flash storage devices 105-1,1 through 105-1,$L_1$ may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used to implement at least a portion of the storage devices 105. Examples of alternatives to flash storage devices that may be used as respective object storage targets in other embodiments of the invention include non-volatile memories such as magnetic random access memory (MRAM) and phase change random access memory (PC-RAM).

The flash storage devices of the first storage tier 112-1 generally provide higher performance than the disk storage devices but the disk storage devices of the second storage tier 112-2 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the cluster file system 100, leading to enhanced system performance relative to conventional arrangements, while additionally or alternatively providing an ability to achieve particular levels of performance at lower cost.

The cluster file system 100 further comprises a burst buffer appliance 150 configured to communicate with clients 102, object storage servers 104 and metadata servers 108 over the network 106. The burst buffer appliance 150 in the present embodiment is assumed to comprise a flash memory or other high-speed memory having a substantially lower access time than the storage tiers 112. The burst buffer appliance 150 may optionally comprise an analytics engine, and may include other components.

Although flash memory will often be used for the high-speed memory of the burst buffer appliance 150, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients 102 executing on compute nodes (not shown) and a file system such as storage tiers 112, for storing bursts of data associated with different types of IO operations.

In the FIG. 1 embodiment, storage tiering control functionality is implemented in the burst buffer appliance 150 in a manner that avoids the need for any significant changes to clients 102, object storage servers 104, metadata server 108 or applications running on those devices.

More particularly, in this embodiment of FIG. 1, the burst buffer appliance 150 comprises a data placement and migration controller 152. The data placement and migration controller 152 is configured to implement storage tiering control functionality for the first and second storage tiers 112-1 and 112-2 which as noted above comprise respective disjoint subsets of the object storage servers 104. The burst buffer appliance 150 is thereby configured to control movement of data between the storage devices 105 of the first and second storage tiers 112-1 and 112-2. Examples of such movement will be described below. The data placement and migration controller 152 may be viewed as one possible example of what is more generally referred to herein as a "controller," and numerous alternative controllers having various configurations may be used in a given metadata server in other embodiments.

The burst buffer appliance 150 further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the burst buffer appliance 150 is network interface circuitry 154. The network interface circuitry 154 allows the burst buffer appliance 150 to communicate over the network 106 with the clients 102, object storage servers 104 and metadata servers 108. The network interface circuitry 154 may comprise, for example, one or more conventional transceivers.

The data placement and migration controller 152 of the burst buffer appliance 150 may be implemented at least in part in the form of software that is stored in memory 158 and executed by processor 156.

The burst buffer appliance 150 comprising processor, memory and network interface components as described above is an example of what is more generally referred to herein as a "processing device." Each of the clients 102, object storage servers 104 and metadata servers 108 may similarly be implemented as a processing device comprising processor, memory and network interface components.

Although only a single burst buffer appliance 150 is shown in the FIG. 1 embodiment, a given cluster file system in other embodiments may comprise multiple burst buffer appliances 150.

The cluster file system 100 may be implemented, by way of example, in the form of a Lustre® file system, although use of Lustre is not a requirement of the present invention. Accordingly, servers 104 and 108 need not be configured with Lustre functionality, but may instead represent elements of another type of cluster file system. An example of a Lustre® file system configured in accordance with an embodiment of the invention will now be described with reference to FIG. 2.

Figure 2:
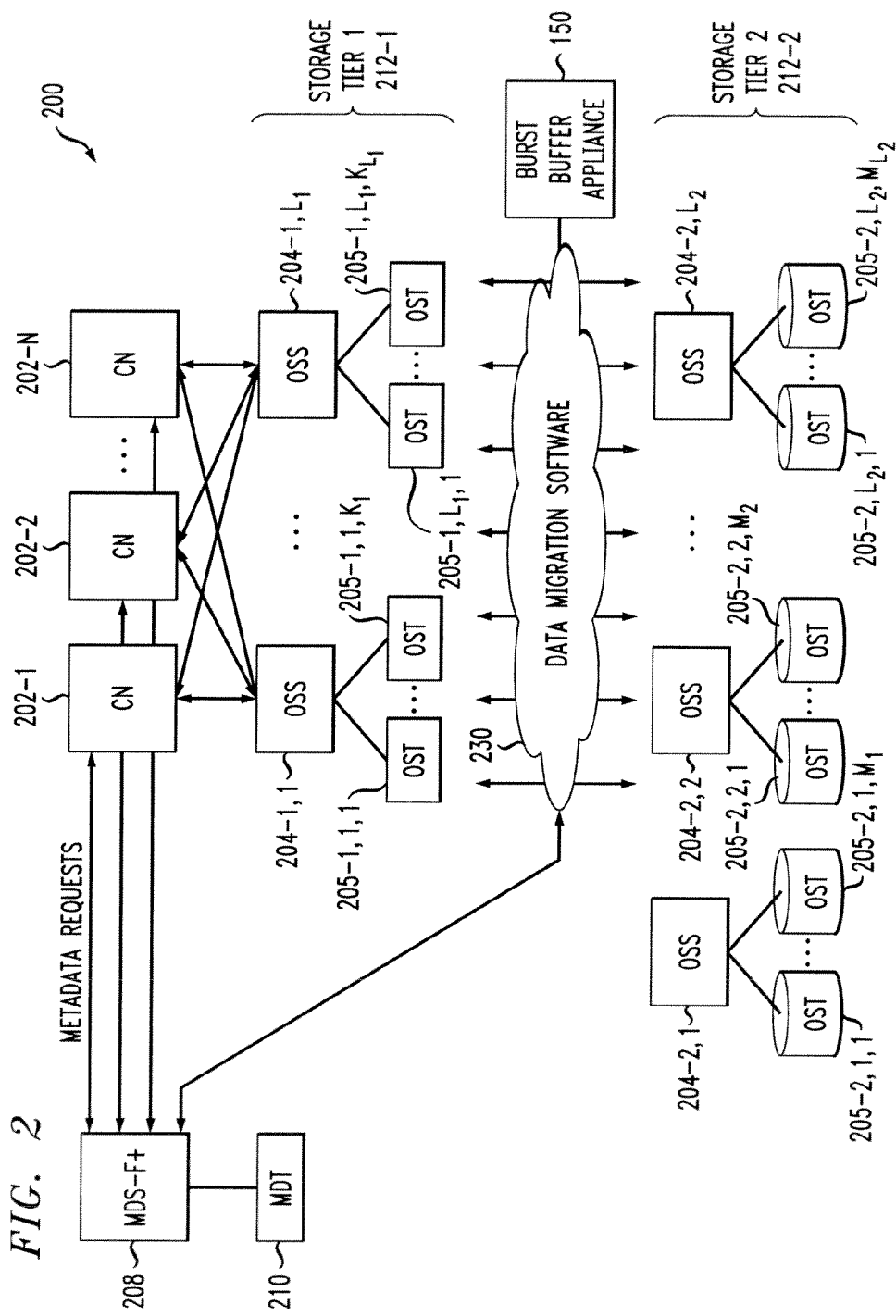
FIG. 2 is a block diagram of another illustrative embodiment of a cluster file system with a burst buffer appliance for controlling movement of data between storage tiers.

As illustrated in FIG. 2, a Lustre® file system 200 in an embodiment of the invention comprises a plurality of clients 202-1, 202-2, . . . 202-N, a plurality of object storage servers 204, a plurality of object storage targets 205, and a metadata server 208 having a corresponding metadata target 210. The clients 202 are more particularly referred to as compute nodes (CNs) in this embodiment. The object storage servers 204, object storage targets 205, metadata server 208 and metadata target 210 are also denoted in this figure as Lustre OSS, OST, MDS and MDT elements, respectively.

A given OSS 204 exposes multiple OSTs 205 in the present embodiment. Each of the OSTs may comprise one or more storage arrays or other types of storage devices. The total data storage capacity of the Lustre® file system 200 is the sum of all the individual data storage capacities represented by the OSTs 205. The clients 202 can concurrently access this collective data storage capacity using data IO requests directed to the OSSs 204 based on metadata obtained from the MDS 208. The IO requests and other similar requests herein may be configured, for example, in accordance with standard portable operating system interface (POSIX) system calls.

The MDS 208 utilizes the MDT 210 to provide metadata services for the Lustre® file system 200. The MDT 210 stores file metadata, such as file names, directory structures, and access permissions.

Additional details regarding conventional aspects of Lustre® file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by configuring the burst buffer appliance 150 of the Lustre file system 200 to incorporate storage tiering control functionality. As will be described, such arrangements advantageously allow for transparent inclusion of a flash storage tier in a cluster file system in a manner that avoids the need for any significant changes to clients, object storage servers, metadata servers or applications running on those devices. Again, other types and configurations of multiple storage tiers and associated storage devices may be used. Also, multiple burst buffers 150 may be implemented in the system in other embodiments.

The particular storage tiering arrangement implemented in Lustre® file system 200 includes first and second storage tiers 212-1 and 212-2, with data migration software 230 being utilized to control movement of data between the tiers. Although shown as separate from the burst buffer appliance 150, the data migration software 230 is assumed to be implemented at least in part in a controller of the burst buffer appliance 150, which may be similar to the data placement and migration controller 152 utilized in the FIG. 1 embodiment. Exemplary features of the data migration software and other functionality associated with a controller of a burst buffer appliance 150 will be described below. Other portions of the data migration software 230 are assumed to be implemented in other system components, such as the OSSs of the first and second storage tiers 212-1 and 212-2.

In the first storage tier 212-1, there are $L_1$ OSSs having $K_1, K_2, \ldots K_{L_1}$ OSTs, respectively. Thus, for example, OSS 204-1,1 has OSTs denoted 205-1,1,1 through 205-1,1,$K_1$, and OSS 204-1,$L_1$ has OSTs denoted 205-1,$L_1$,1 through 205-1,$L_1$,$K_{L1}$.

In the second storage tier 212-2, there are $L_2$ OSSs having $M_1, M_2, \ldots M_{L2}$ OSTs, respectively. Thus, for example, OSS 204-2,1 has OSTs denoted 205-2,1,1 through 205-2,1,$M_1$, OSS 204-2,2 has OSTs denoted 205-2,2,1 through 205-2,2,$M_2$, and OSS 204-2,$L_2$ has OSTs denoted 205-2,$L_2$,1 through 205-2,$L_2$,$M_{L2}$.

As in the FIG. 1 embodiment, it is assumed that the OSTs of the first storage tier 212-1 are "fast" relative to the "slow" OSTs of the second storage tier 212-2. For example, the OSTs of the first storage tier 212-1 may comprise primarily flash storage devices and the OSTs of the second storage tier 212-2 may comprise primarily disk storage devices. As mentioned previously, the flash storage devices generally provide higher performance than the disk storage devices but the disk storage devices generally provide higher capacity at lower cost than the flash storage devices. Like the FIG. 1 embodiment, the exemplary tiering arrangement of FIG. 2 makes it possible to dynamically balance the conflicting requirements of storage capacity and IO throughput, thereby avoiding situations in which either performance is less than optimal or the costs of implementing the system become excessive. This is achieved in the present embodiment primarily by introduction of the burst buffer appliance 150, and therefore with minimal disruption to other system elements such as clients 102, object storage servers 104, metadata servers 208 or applications running on those devices. The MDS 208 in the FIG. 2 embodiment is also denoted as an MDS-F+ component as it is configured to support a flash extension of the cluster file system 200 using a flash storage tier as previously described.

It should be noted with regard to the illustrative embodiments of FIGS. 1 and 2 that relatively minor modifications may be made to one or more applications or other system elements or components in order to achieve additional improvements. For example, a job scheduler or other similar component within the system 100 or 200 can also be modified so as to take full advantage of the available storage tiering functionality. Also, some relatively minor modifications may be made to at least a portion of the object storage servers 104 or 204. For example, object storage servers of each of the storage tiers 112 or 212 in the system 100 or 200 may be optimized for use with the corresponding storage device type of their corresponding storage tier.

Figure 3:
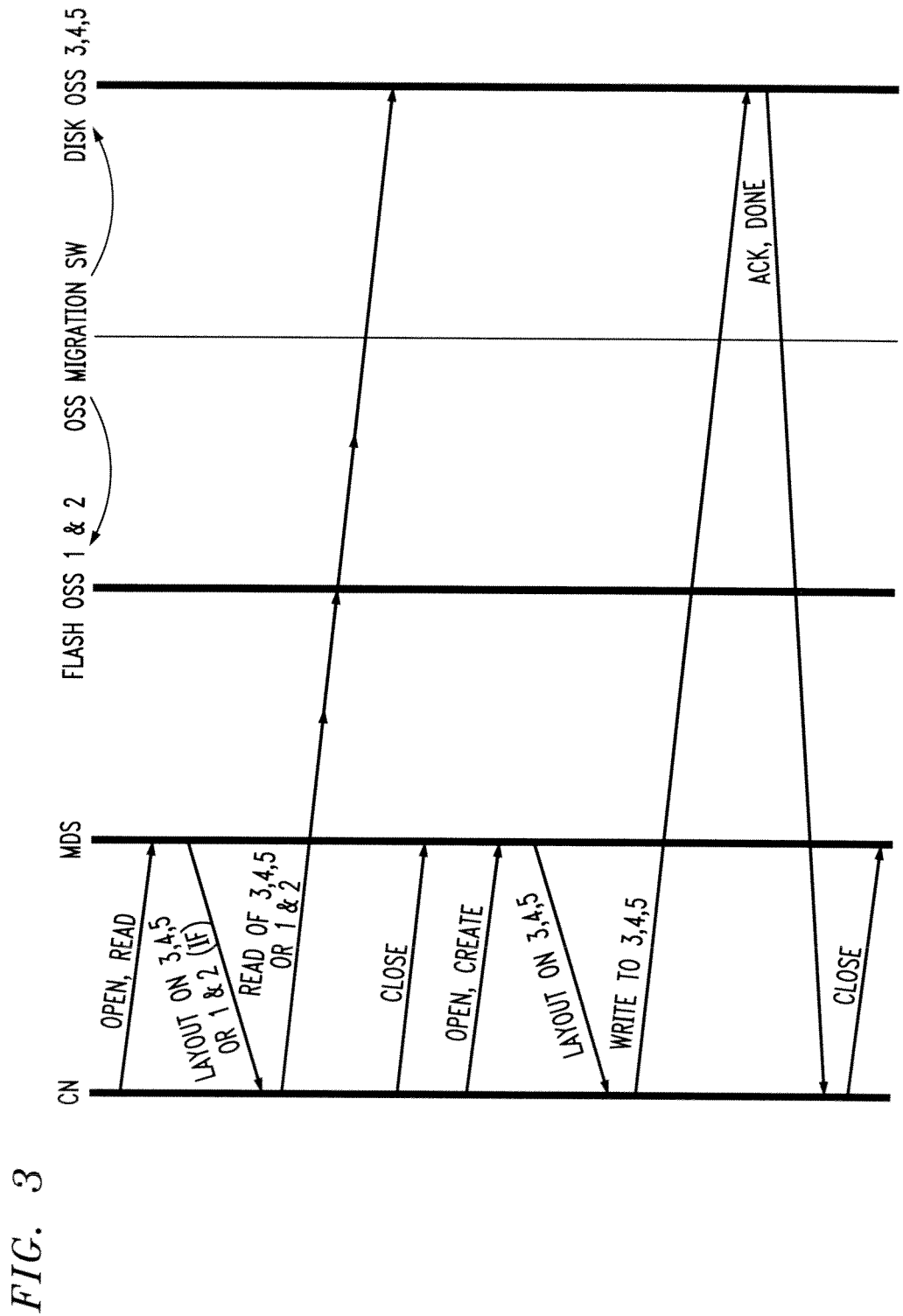
FIG. 3 is a flow diagram illustrating exemplary operations of a cluster file system in illustrative embodiments.

Examples of operations that may be performed in the system 100 or 200 utilizing the burst buffer appliance 150 will now be described in more detail with reference to the flow diagram of FIG. 3. In FIG. 3, interactions are shown between system elements including a given client 102 or 202 denoted CN, metadata server 108 or 208 denoted MDS, a flash storage tier 112-1 or 212-1 comprising object storage servers 104 or 204 denoted OSS 1 and OSS 2, and a disk storage tier 112-2 or 212-2 comprising object storage servers 104 or 204 denoted OSS 3, OSS 4 and OSS 5. Migration of data between the storage tiers is carried out using data migration software 230 which is assumed to be provided at least in part by a controller of the burst buffer appliance 150, although it is illustrated in FIG. 3 as a separate component denoted OSS Migration SW. Portions of the OSS Migration SW are assumed to be implemented in the OSSs of the storage tiers.

In these examples, as in other embodiments described herein, the flash storage tier is also referred to as a "fast" storage tier and the disk storage tier is also referred to as a "slow" storage tier. Again, the terms "fast" and "slow" in this context are relative terms and should not be construed as requiring any particular absolute performance levels.

Referring now more particularly to the flow diagram of FIG. 3, the operations illustrated herein include exemplary read and write operations that are performed without any migration of data between storage tiers. The client CN sends an "open, read" request to the MDS which responds with metadata that is assumed to comprise a layout of at least a portion of the flash storage tier comprising OSSs 1 and 2, or a layout of at least a portion of the disk storage tier comprising OSSs 3, 4 and 5, if the requested data resides in one of those tiers. The read operation is then performed by the CN interacting with one or more of the OSSs of the appropriate storage tier using the layout metadata provided by the MDS. Upon completion of the read operation, a "close" request is sent by the CN to the MDS as indicated.

The client CN then sends an "open, create" request to the MDS which responds with metadata that is assumed to comprise a layout of at least a portion of the disk storage tier comprising OSSs 3, 4 and 5. The write operation is then performed by the CN interacting with one or more of the OSSs of the disk storage tier using the layout metadata provided by the MDS. Upon completion of the write operation, an acknowledgement message denoted "ack, done" is provided by the appropriate OSS of the disk storage tier back to the CN. A "close" request is then sent by the CN to the MDS as indicated.

Figure 4:
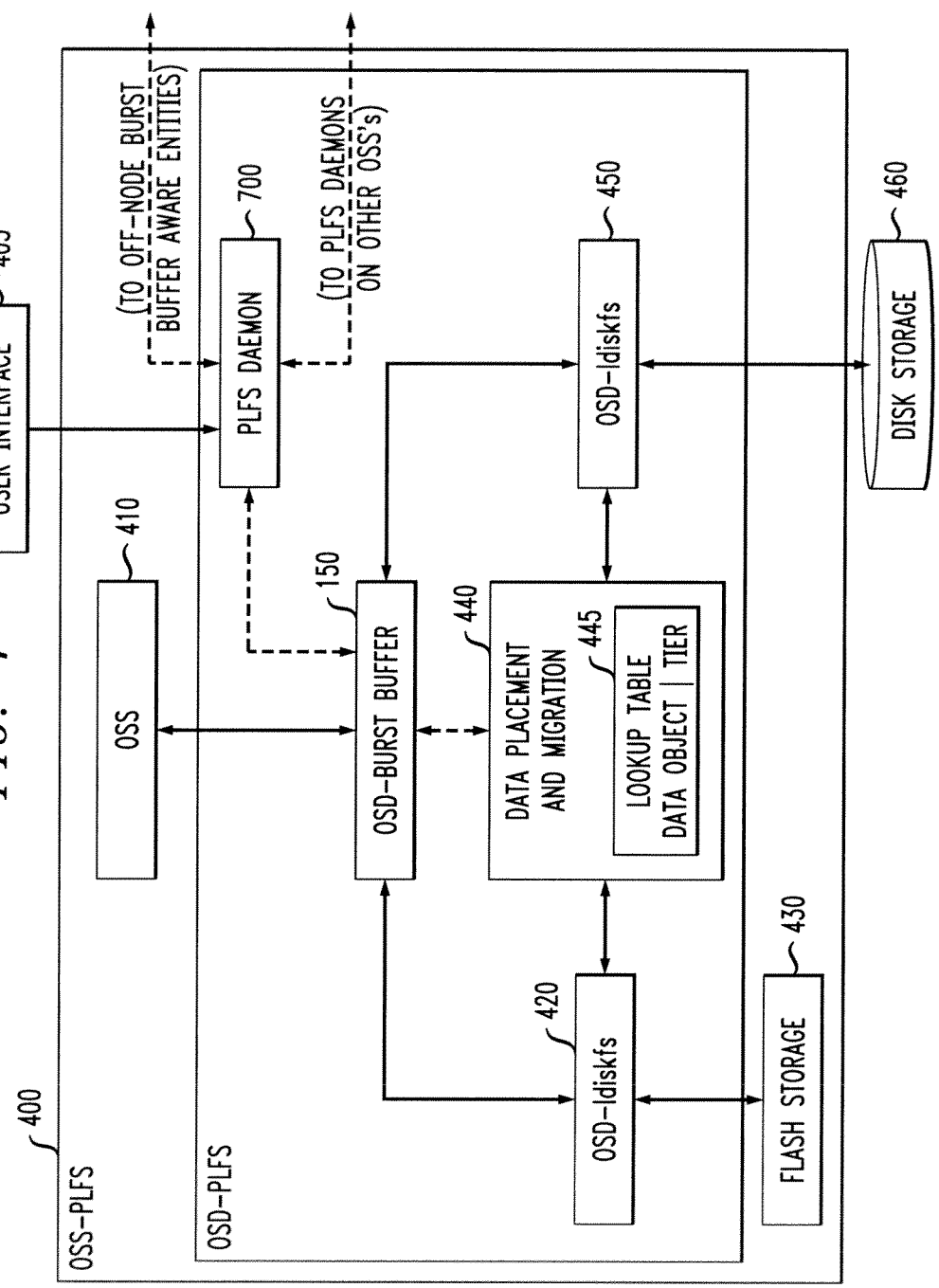
FIG. 4 is a block diagram of an exemplary OSS with a burst buffer appliance for controlling movement of data between storage tiers.

FIG. 4 is a block diagram of an exemplary OSS 400 with a burst buffer appliance 150 for controlling movement of data between storage tiers 112. The exemplary OSS 400 allows the cluster file system 100 of FIG. 1 to communicate with a parallel log structured file system (PLFS) in accordance with one aspect of the present invention. As indicated above, the exemplary burst buffer appliance 150 implements storage tiering control functionality in a manner that avoids the need for any significant changes to clients 102, object storage servers 104, metadata server 108 or applications running on those devices. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

As shown in FIG. 1, the OSS-PLFS 400 comprises an OSS 410 that communicates with an OSD-burst buffer 150, as discussed further below in conjunction with FIG. 6. The OSD-burst buffer 150 communicates with a data placement and migration controller 440 and a PLFS daemon 700, as discussed further below in conjunction with FIG. 7 to implement functions of the present invention. The data placement and migration controller 440 may be at least partially implemented as part of the OSD-burst buffer 150 as a controller 152, as discussed above in conjunction with FIG. 1. As indicated above, the data placement and migration controller 440 actually moves the data in response to certain system calls, such as plfs_file_purge and plfs_file_prestage operations, discussed below.

As indicated above, according to one aspect of the invention discussed further below in conjunction with FIGS. 8 and 9A-9D, a cluster file system 100, 200 implements coordinated storage tiering control functionality across a plurality of object storage servers 410 based on a specification received from a user or client 102 by means of a user interface 405 using one or more burst buffer appliances 150.

An exemplary user interface 405 provides functions that a user or client 102 can call to instruct the cluster file system 100, 200 to move data among storage tiers 112. For example, in one exemplary implementation, the user interface 405 provides the following four exemplary functions:

plfs_file_purge(file f): move data from flash storage 105-1 to disk storage 105-2;

plfs_file_prestage(file f): move data from disk storage 105-2 to flash storage 105-1;

plfs_file_query(file f): request an indication of where a given file is stored (i.e. flash storage 105-1 or disk storage 105-2); and plfs_file_map(file f): request an indication of where a given file portion is stored (file contents) (i.e. which byte ranges are on which OSS).

In one exemplary implementation, the OSD-PLFS of FIG. 4 will maintain a lookup table 445 in the data placement and migration controller 440 for every data object that it stores, indicating whether the corresponding object is stored in a flash tier or a disk tier in the exemplary embodiment. As noted above, additional or alternative storage tiers are also within the scope of the present invention.

The exemplary PLFS daemon 700 runs on each OSS node 400 and communicates with the OSD. For example, a client 102 on a compute node may request data from an OSS. The OSS notifies the PLFS daemon 700 on the OSS 400 of the data request. The PLFS daemon 700 on the originating OSS 400 knows that the exemplary requested data is part of a logical file that is striped across a plurality of OSSs 400. The originating PLFS daemon 700 can then notify PLFS daemons 700 on other OSSs 400 storing portions of the requested logical file of the request and indicate that the other OSSs 400 should pre-fetch their data portions. The exemplary PLFS daemon 700 can also optionally communicate with off-node burst buffer-aware entities.

As shown in FIG. 4, the OSS 400 further comprises an OSD-ldiskfs (local disk file system) 420 for a flash storage system 430 and disk storage system 460, respectively, in a known manner.

FIG. 5 illustrates an exemplary stack 500 for the OSD-PLFS 400 of FIG. 4. As indicated above, the exemplary burst buffer appliance 150 implements storage tiering control functionality in a manner that avoids the need for any significant changes to clients 102, object storage servers 104, metadata server 108 or applications running on those devices. Thus, layers 510, 520, 530 and 550 of the exemplary stack 500 are unmodified, relative to a conventional Lustre implementation.

Layer 540 is a modified layer of the stack 500, corresponding to the OSD-PLFS of FIG. 4. In this manner, an additional file system plug in or file system interface is provided for the abstract layer of Lustre (in addition to, for example, existing ZFS and ldiskfs plug ins/file system interfaces).

Layer 560 is also a modified layer of the stack 500, corresponding to the modified burst buffer implementation of PLFS which comprises the data migration functionality of burst buffer PLFS in accordance with the present invention, as well as conventional PLFS burst buffer functionality. As discussed above, the burst buffer appliance 150 communicates with flash storage 570 (such as flash storage 105-1 of FIG. 1) and disk storage 580 (such as disk storage 105-2) to migrate data among the various storage tiers 112.

For a more detailed discussion of stacks for Lustre clustered file systems, see, for example, A. Dilger et al., "Lustre on ZFS," Lustre Admin and Developer Workshop (Sep. 24, 2012), incorporated by reference herein.

FIG. 6 illustrates exemplary pseudo code 600 for the OSD-Burst Buffer 150 of FIGS. 1, 2 and 4. As shown in FIG. 6, the exemplary pseudo code 600 comprises functions for writing data and reading data. The write function initially writes all data to a flash storage device 105-1, which can then optionally be migrated later to a disk storage device 105-2 in the exemplary embodiment. Similarly, for a read operation, the OSD-Burst Buffer 150 accesses the lookup table 445 to determine whether data is stored on a flash storage device 105-1 or a disk storage device 105-2 (i.e., which tier is the data object stored on). If the data is stored on a disk storage device 105-2, the OSD-Burst Buffer 150 requests the data placement and migration controller 440 to move the data to a flash storage device 105-1 (and the lookup table is updated). An activity log is sent to the PLFS daemon 700.

FIG. 7 illustrates exemplary pseudo code for the PLFS daemon 700 of FIG. 4. In an exemplary implementation, discussed above, the PLFS daemon 700 performs pre-staging whereby, upon a request for a portion of a logical file that is striped across a plurality of OSSs 400, the originating PLFS daemon 700 notifies PLFS daemons 700 on other OSSs 400 storing portions of a requested logical file of the request and indicates that the other OSSs 400 should prefetch their data portions.

As shown in FIG. 7, the exemplary PLFS daemon 700 initially receives an activity log from the OSD-Burst Buffer 150 and from other daemons 700, and/or write, read and/or unlink commands from the OSD-Burst Buffer 150 and/or pre-stage requests from other daemons 700.

The exemplary PLFS daemon 700 comprises functions for processing each possible received item. For example, upon a write operation, the exemplary PLFS daemon 700 will use an Evict command to request the data placement and migration controller 440 (FIG. 4) to move some victim blocks from flash storage 105-1 to disk storage 105-2 if there is not enough flash storage for the new write operation.

Similarly, for a read operation, the exemplary PLFS daemon 700 determines whether a file that is stored on a plurality of OSSs should be pre-fetched using a pre-stage command. Likewise, when another daemon 700 suggests pre-staging to the current PLFS daemon 700, the current PLFS daemon 700 employs a pre-stage operation.

User Control of Coordinated Storage Tiering Control

As indicated above, according to one aspect of the invention discussed further below in conjunction with FIGS. 8 and 9A-9D, a cluster file system 100, 200 implements coordinated storage tiering control functionality across a plurality of object storage servers 410 based on a specification received from a user or client 102 by means of a user interface 405 using one or more burst buffer appliances 150.

Figure 8:
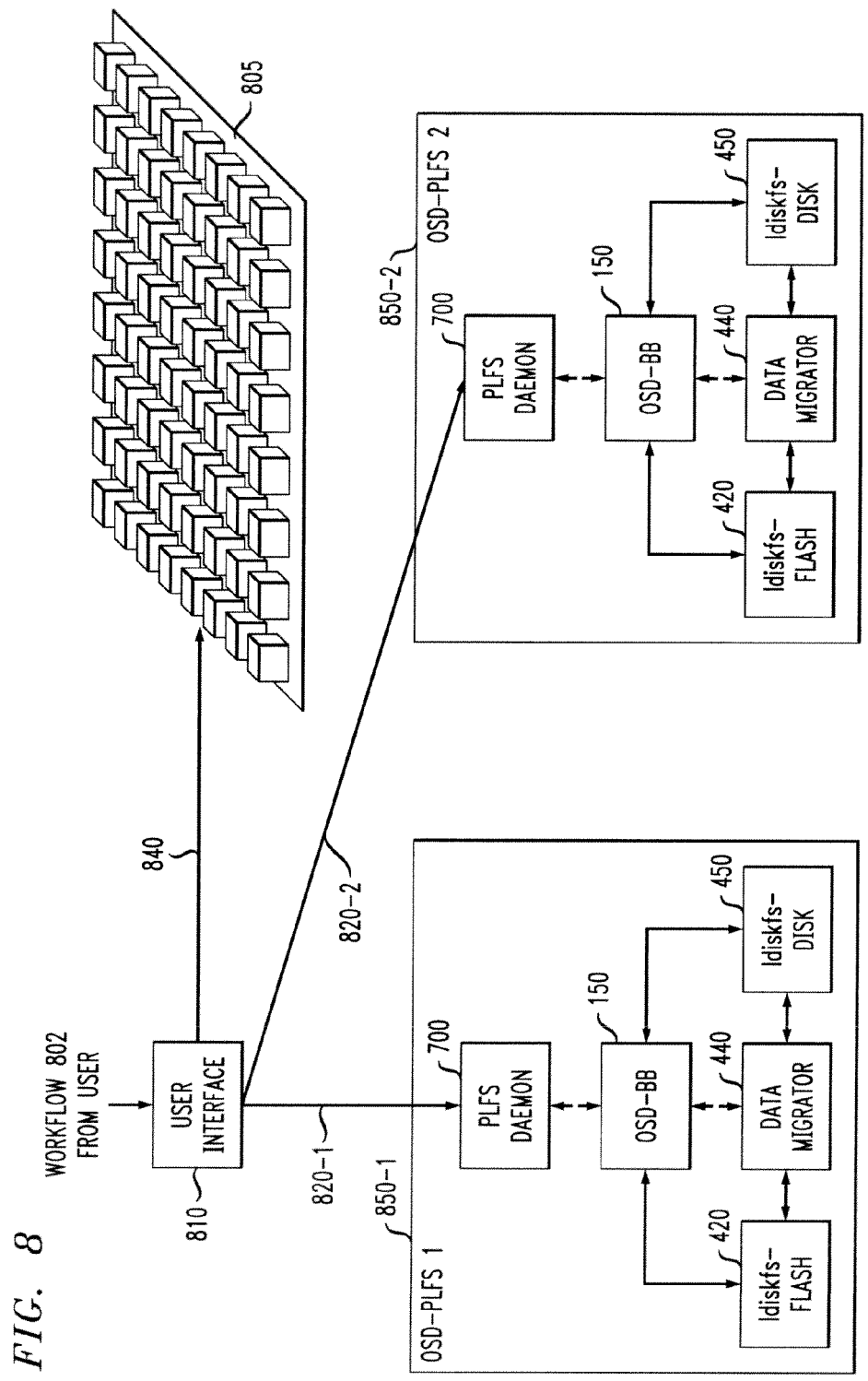
FIG. 8 illustrates a coordinated prefetch of one or more data items in accordance with an external control aspect of the present invention.

FIG. 8 illustrates a coordinated prefetch of one or more data items in accordance with an external control aspect of the present invention. As shown in FIG. 8, an exemplary workflow 802 is received from a user or client 102 by means of a user interface 810. The workflow 802 may comprise, for example, a data pre-stage for a job schedule for a plurality of compute nodes 805 in a high performance computing (HPC) network. The received pre-stage workflow 802 is provided to the PLFS daemon 700 each OSD-PLFS 850-1, 850-2 storing files and/or portions of such files involved in the workflow. As discussed hereinafter, in response to the received pre-stage workflow 802, each PLFS daemon 700 on each OSD-PLFS 850 will forward the request 820-1, 820-2 to the OSD-burst buffers on the respective OSD-PLFS 850, which in turn, will forward the request to the respective data migrator 440.

Upon completion of the pre-staging, the user interface 810 then launches the job on the compute nodes 805 at step 840. The work will now proceed more quickly, relative to conventional designs, since the data has been pre-loaded into a faster storage tier 112.

As indicated above, an exemplary user interface 405 provides functions that a user or client 102 can call to instruct the cluster file system 100, 200 to move data among storage tiers 112. For example, in one exemplary implementation, the user interface 405 provides the following four exemplary functions:

plfs_file_purge(file f): move data from flash storage 105-1 to disk storage 105-2;

plfs_file_prestage(file f): move data from disk storage 105-2 to flash storage 105-1;

plfs_file_query(file f): request an indication of where a given file is stored (i.e. flash storage 105-1 or disk storage 105-2); and plfs_file_map(file f): request an indication of where a given file portion is stored (file contents) (i.e. which byte ranges are on which OSS).

FIGS. 9A through 9D illustrate pseudo code for the user interface, PLFS daemon, data migrator and OSD-Burst Buffer of FIG. 4 for an exemplary prestage operation. An implementation for purge, query and mapping operations would be readily apparent to a person of ordinary skill in the art based on the present disclosure.

FIG. 9A illustrates pseudo code for the user interface 405 of FIG. 4 for an exemplary prestage operation. As shown in FIG. 9A, the exemplary user interface 810 allows a user or client 102 to issue a prestage command for a given file.

FIG. 9B illustrates pseudo code for the PLFS daemon 700 of FIG. 4 for an exemplary prestage operation. As shown in FIG. 9B, in response to a prestage command for a given file from a user or client 102, the PLFS daemon 700 will initially determine which OSDs 850 have portions of the given file, and then notify each OSD 850 having a portion of the file of the requested pre-staging.

FIG. 9C illustrates pseudo code for the data migrator 440 of FIG. 4 for an exemplary prestage operation. As shown in FIG. 9C, in response to a prestage command for a given file from a user or client 102, the data migrator 440 will initially determine which portions of the file of the requested pre-staging are stored locally and will then transfer the local data portions to a faster storage tier 112, such as from disk storage 105-2 to flash storage 105-1.

FIG. 9D illustrates pseudo code for the OSD-Burst Buffer 150 of FIG. 4 for an exemplary prestage operation. As shown in FIG. 9D, in response to a prestage command for a given file from a user or client 102, the OSD-Burst Buffer 150 will instruct the data migrator 440 to transfer the local data portions to a faster storage tier 112, such as from disk storage 105-2 to flash storage 105-1.

It is to be appreciated that the particular operations and associated messaging illustrated in FIGS. 3, 6-7 and 9A-9D are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the cluster file system 100. Such components can communicate with other elements of the cluster file system 100 over any type of network or other communication media.

As indicated previously, components of a burst buffer appliance as disclosed herein can be implemented at least in part in the form of one or more software programs stored in memory and executed by a processor of a processing device. A memory having such program code embodied therein is an example of what is more generally referred to herein as a "computer program product."

The cluster file systems 100 and 200 or portions thereof may be implemented using one or more processing platforms each comprising a plurality of processing devices. Each such processing device may comprise processor, memory and network interface components of the type illustrated for burst buffer appliance 150 in FIG. 1.

As indicated above, cluster file system functionality such as that described in conjunction with FIGS. 1 through 7 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from burst buffer implemented storage tiering control functionality as described herein. Also, the particular configurations of system and device elements shown in FIGS. 1, 2 and 4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An object storage device of a cluster file system comprising:
    a burst buffer appliance configured to communicate with a plurality of object storage servers of the cluster file system over a network; and
    a daemon for notifying, in response to a request for at least a portion of a logical file that is striped across said plurality of object storage servers, at least one external object storage server that stores a different portion of said requested logical file to pre-fetch the different portion, wherein said request and said notifying occur substantially simultaneously;
    the burst buffer appliance further configured to implement storage tiering control functionality for at least first and second storage tiers comprising respective disjoint subsets of the plurality of object storage servers to control movement of data between the first and second storage tiers, wherein said burst buffer appliance implements said movement of data between the first and second storage tiers based on a user specification, wherein said burst buffer appliance comprises a high-speed memory that provides a buffer between a plurality of clients on one or more compute nodes and said cluster file system for storing data associated with input-output (IO) operations;
    the object storage device being implemented utilizing at least one processing device coupled to a memory.

2. The object storage device of claim 1, further comprising a parallel log structured file system daemon for processing said user specification to implement said requested movement of data.

3. The object storage device of claim 1, wherein said user specification comprises a user request to move data from a first storage tier to a second storage tier.

4. The object storage device of claim 1, wherein said user specification comprises a user request for an indication of where a given file is stored.

5. The object storage device of claim 1, wherein said user specification comprises a user request for an indication of a given storage tier where a given file is stored.

6. The object storage device of claim 1, wherein said user specification comprises a user request for an indication of an object storage server storing one or more given file portions.

7. The object storage device of claim 6, wherein the object storage targets of the first type comprise respective non-volatile electronic storage devices including one or more of flash, MRAM and PC-RAM.

8. The object storage device of claim 6, wherein the object storage targets of the second type comprise respective disk storage devices.

9. The object storage device of claim 1, wherein each of the object storage servers is configured to interface with at least one object storage target, and further wherein the object storage servers in the first storage tier are configured to interface with object storage targets of a first type and the object storage servers in the second storage tier are configured to interface with object storage targets of a second type different than the first type.

10. The object storage device of claim 1, wherein the cluster file system comprises a Lustre file system.

11. The object storage device of claim 1, wherein the burst buffer appliance is further configured to communicate with a plurality of clients over the network and to process requests from said clients.

12. The object storage device of claim 1, wherein the burst buffer appliance further comprises a controller to implement said storage tiering control functionality.

13. The object storage device of claim 12, wherein the controller comprises a data placement and migration controller.

14. The object storage device of claim 12, wherein at least a portion of the controller is implemented using data migration software at least a portion of which is stored in said memory and executed by said processor.

15. A processing platform comprising the object storage device of claim 1.

16. A method comprising:
    configuring a burst buffer appliance of an object storage device of a cluster file system to communicate with a plurality of object storage servers of the cluster file system over a network;
    configuring a daemon of said object storage device to notify, in response to a request for at least a portion of a logical file that is striped across said plurality of object storage servers, at least one external object storage server that stores a different portion of said requested logical file to pre-fetch the different portion, wherein said request and said notifying occur substantially simultaneously; and
    implementing storage tiering control functionality in the burst buffer appliance for at least first and second storage tiers comprising respective disjoint subsets of the plurality of object storage servers to control movement of data between the first and second storage tiers, wherein said burst buffer appliance implements said movement of data between the first and second storage tiers based on a user specification, wherein said burst buffer appliance comprises a high-speed memory that provides a buffer between a plurality of clients on one or more compute nodes and said cluster file system for storing data associated with input-output (IO) operations.

17. The method of claim 16, further comprising the step of a parallel log structured file system daemon processing said user specification to implement said requested movement of data.

18. The method of claim 16, wherein said user specification comprises one or more of a user request to move data from a first storage tier to a second storage tier, a user request for an indication of where a given file is stored, a user request for an indication of a given storage tier where a given file is stored and a user request for an indication of an object storage server storing one or more given file portions.

19. The method of claim 16, further comprising moving data between the first and second storage tiers under control of the burst buffer appliance.

20. The method of claim 16, further comprising:
configuring the object storage servers in the first storage tier to interface with object storage targets of a first type; and
configuring the object storage servers in the second storage tier to interface with object storage targets of a second type different than the first type;
wherein the first and second different types of object storage targets provide respective different levels of performance.

21. The method of claim 16, wherein the daemon communicates with one or more external burst buffer-aware entities.

22. The method of claim 16, wherein the daemon receives one or more commands from one or more of a user and a client by means of a user interface.

23. A computer program product comprising a non-transitory machine-readable storage medium having encoded therein executable code of one or more software programs, wherein the one or more software programs when executed cause the burst buffer appliance to perform the steps of the method of claim 16.

24. A cluster file system comprising:
a burst buffer appliance; and
a plurality of object storage servers coupled to the burst buffer appliance via a network, each of said object storage servers comprising a daemon for notifying, in response to a request for at least a portion of a logical file that is striped across said plurality of object storage servers, at least one external object storage server that stores a different portion of said requested logical file to pre-fetch the different portion, wherein said request and said notifying occur substantially simultaneously;
the burst buffer appliance configured to implement storage tiering control functionality for at least first and second storage tiers comprising respective disjoint subsets of the plurality of object storage servers;
the burst buffer appliance thereby being configured to control movement of data between the first and second storage tiers, wherein said burst buffer appliance implements said movement of data between the first and second storage tiers based on a user specification, wherein said burst buffer appliance comprises a high-speed memory that provides a buffer between a plurality of clients on one or more compute nodes and said cluster file system for storing data associated with input-output (IO) operations.

25. The cluster file system of claim 24, further comprising a parallel log structured file system daemon for processing said user specification to implement said requested movement of data.

26. The cluster file system of claim 24, wherein said user specification comprises one or more of a user request to move data from a first storage tier to a second storage tier, a user request for an indication of where a given file is stored, a user request for an indication of a given storage tier where a given file is stored and a user request for an indication of an object storage server storing one or more given file portions.

27. The cluster file system of claim 24, wherein the cluster file system comprises a Lustre file system.

28. The object storage device of claim 1, wherein the daemon communicates with one or more external burst buffer-aware entities.

29. The object storage device of claim 1, wherein the daemon receives one or more commands from one or more of a user and a client by means of a user interface.

* * * * *